United States Patent

[11] 3,560,630

| | | |
|---|---|---|
| [72] | Inventor | Chester A. Heather |
| | | LaSalle, Ill. |
| [21] | Appl. No. | 848,558 |
| [22] | Filed | Aug. 8, 1969 |
| [45] | Patented | Feb. 2, 1971 |
| [73] | Assignee | Electrical Utilities Company |
| | | LaSalle, Ill. |
| | | a corporation of Illinois |

[54] ELECTRICAL COMPONENT GROUNDING TERMINAL ASSEMBLY
4 Claims, 5 Drawing Figs.

[52] U.S. Cl. .................................................. 174/51,
174/153, 339/14, 339/277
[51] Int. Cl. ...................................................... H01g 1/14
[50] Field of Search ............................................ 174/50.52,
50.55, 50.56, 51, 52.5, 153; 317/256, 257,
(Inquired); 339/14, 14L, 147C, 275A, 276C,
277C, 278, 278A

[56] References Cited
UNITED STATES PATENTS

| | | | |
|---|---|---|---|
| 2,220,615 | 11/1940 | Pittman et al. | 174/51X |
| 2,513,147 | 6/1950 | Chorpening | 174/51 |
| 2,790,024 | 4/1957 | Fulmer | 174/153X |
| 3,015,687 | 1/1962 | Ruscito | 174/153 |
| 3,179,920 | 4/1965 | McGinty | 174/153X |

*Primary Examiner*—Laramie E. Askin
*Attorney*—Hill, Sherman, Meroni, Gross & Simpson ABSTRACT: A terminal assembly for an electrical component of the type wherein the component is enclosed within a conductive housing through which electrical connections to the component are made employs a grounding terminal electrically and mechanically connected to the housing adjacent the circuit terminals of the component. The grounding terminal is an integral portion of the terminal assembly and is configured to be secured to the housing in close proximity to the circuit terminals, and is provided with mechanical rigidity and electrical conductivity by way of an arcuate portion which is spotwelded to the housing. The terminal also includes a connecting portion which is adapted to receive a soldered connection or a quick-connect lead connector.

PATENTED FEB 2 1971
3,560,630
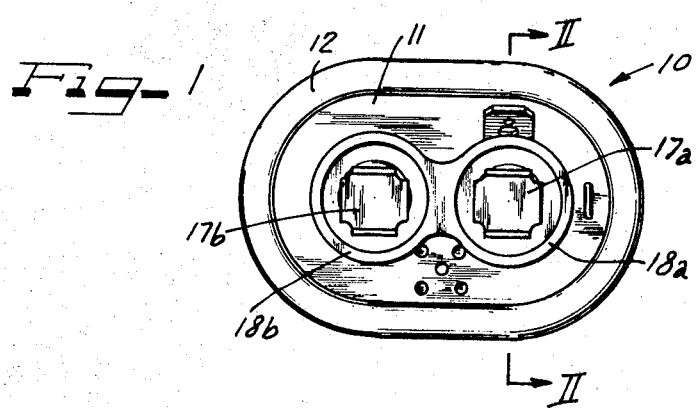
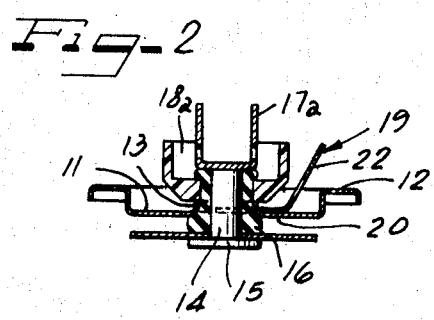
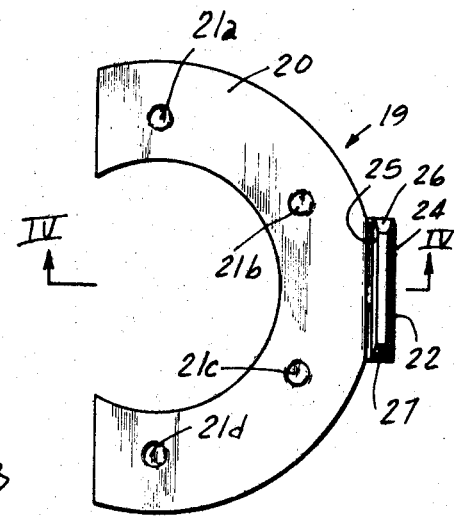
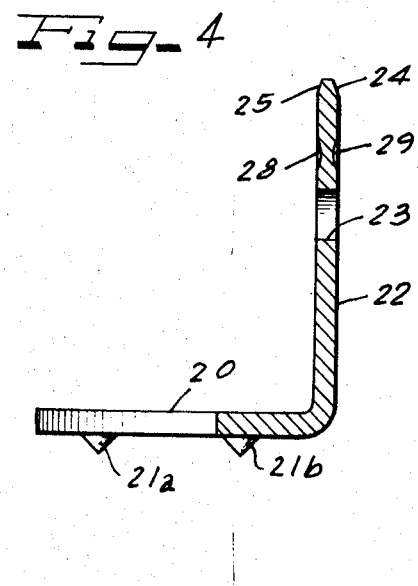
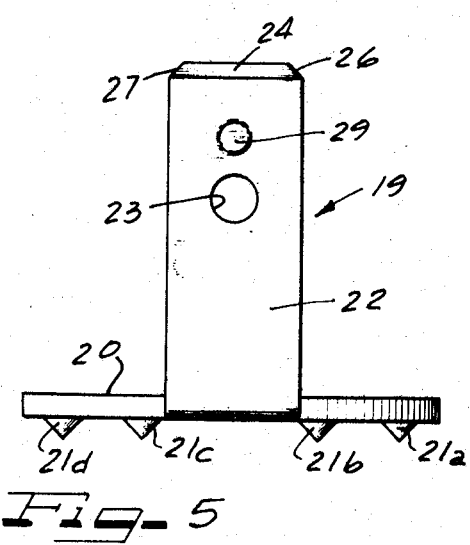
INVENTOR.
CHESTER A. HEATHER
BY Hill, Sherman, Meroni, Gross & Simpson ATTORNEYS 3,560,630

1

ELECTRICAL COMPONENT GROUNDING TERMINAL ASSEMBLY

BACKGROUND OF THE INVENTION

1. Field of the Invention

This invention relates to terminal assemblies for electrical components, and more particularly to a terminal assembly for an electrical component of the type which is mounted within a conductive housing and which includes a grounding terminal adapted to receive a circuit connection for placing the housing at a reference potential.

2. Description of the Prior Art

Heretofore, electrical components mounted within conductive housings included one terminal assembly for connecting the component in the desired circuit and a separate terminal assembly, generally spaced far from the circuit terminal assembly, for connecting the housing or can to a reference potential, e.g. ground potential. Further, the grounding terminal assembly included a grounding terminal which was mechanically secured to the housing by means of threaded interengaging members.

SUMMARY OF THE INVENTION

According to the invention, a grounding terminal is provided in a terminal assembly in which the grounding terminal and the terminals of the electrical component, for example a capacitor, are located in close proximity at one end of a can-type conductive housing. The proximity of the terminals of the assembly facilitates wiring the capacitor into its application circuit and the provision of all terminals at one end of the component housing facilitates handling and stacking of the terminal assemblies. The grounding terminal is provided as having an arcuate-shaped portion which partially embraces a circuit terminal to provide the close proximity therebetween while the amount of material in the arcuate-shaped portion provides rigidity to the grounding terminal. In addition, the arcuate-shaped portion is spot welded to the housing to provide a mechanically secure and electrically conductive connection. The grounding terminal includes a connection portion which is adapted to receive a soldered connection or a quick-connect spade connector.

BRIEF DESCRIPTION OF THE DRAWING

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which:

FIG. 1 is a top view of a terminal assembly according to the invention;

FIG. 2 is a sectional view taken along the line II–II of FIG. 1;

FIG. 3 is a top plan view of a grounding terminal employed in the terminal assembly of FIG. 1;

FIG. 4 is a cross-sectional view of the grounding terminal taken along the line IV–IV of FIG. 3; and FIG. 5 is an elevational view of the grounding terminal illustrated in FIG. 3.

BRIEF DESCRIPTION OF THE PREFERRED EMBODIMENT

In the drawings, there is generally shown at 10 a terminal assembly for a capacitor comprising a housing top wall 11 having a rolled edge 12 and a plurality of apertures defined by the outward protruding edges 13.

Extending through each of these apertures is a conductive pin 14 having a head 15. Disposed between the pin 14 and the protruding edge 13 of each aperture is a hollow cylindrical insulator 16 which insulates the top wall 11 from the conductive pin 14. The circuit leads of the electrical component are connected to the head 15 of pin 14 by soldering, etc., as is well known in the art. Connected to the exterior end of each pin 14

2 is a U-shaped terminal 17a, 17b for connection to an external application circuit.

A plurality of joined cup like insulators 18a and 18b are provided to maintain the conductive wall 11, particularly rolled edge 12 thereof, away from external circuit leads. This is particularly important in applications where the component is mounted on a circuit board having exposed conductors.

A grounding terminal 19 is provided for the component. The grounding terminal 19 includes an arcuate-shaped member 20 having a plurality of protrusions 21a—21d depending from the lower surface thereof to facilitate spot welding at these positions to the top wall 11. The spotwelding of this component provides excellent electrical and mechanical connection between these elements while the mass of the arcuate-shaped portion 20 and the shape of the portion provides sufficient rigidity of the terminal and the provision of the body of the terminal in close proximity to a circuit terminal of the component.

The grounding terminal further includes a connecting portion 22 extending at an angle therefrom sufficient to clear the insulator 18a, 18b. The connection portion 22 includes an aperture 23 therethrough to receive a conductor for a soldered connection. The portion 22 further includes a coined end defined by the surfaces 24—27 and a pair of detents 28 and 29 which adapt the connecting portion to receive a quick-connect terminal.

Generally then, there has been described a terminal assembly in which the grounding terminal is mechanically secure and electrically connected to the conductive housing of an electrical component by spotwelding. All connections including the terminals of the electrical component and the grounding terminal are in close proximity, which facilitates wiring the electrical component into its application circuit. The grounding terminal is an integral part of the terminal assembly and all terminals are located at one end of the electrical component to facilitate handling and stacking techniques now being employed in the manufacture of such components.

In addition to the foregoing, the terminal assembly can be masked with standard paint spray fixtures presently being employed, rather than applying a special mask for the additional provision of the proximate grounding terminal and the cover or end wall of the electrical component may be rolled onto the housing or can with only slight alteration of rolling dies presently being employed by the art. Further, the grounding terminal is a universal type terminal which will accept a quick-connect, or a soldered connection.

I claim:

1. A terminal assembly for an electrical component having a plurality of component leads for connection to an external circuit, comprising:

a conductive housing including a top wall having a plurality of apertures therethrough, each of said apertures being defined by an externally protruding edge;

a plurality of electrically insulative members individually disposed in said apertures, each of said insulative members having a bore therethrough;

a plurality of conductive pins individually extending through the bores of separate ones of said insulative members to individually connect to the component leads at the inner ends thereof;

a separate circuit terminal carried by each of said pins for receiving external circuit connections; and a grounding terminal electrically connected to said housing, said grounding terminal disposed adjacent one of said apertures and including an arcuate-shaped portion partially embracing the corresponding protruding edge, said arcuate-shaped portion including a plurality of integral protrusions welded to said tip wall, and a connecting portion integral with said arcuate-shaped portion and extending at an angle therefrom for receiving a circuit ground connection.

2. A terminal assembly for an electrical component having an electrically conductive housing comprising a plurality of circuit terminals extending through said housing, means insulating said plurality of circuit terminals from said housing, and at least one grounding terminal mechanically secured and electrically connected to said housing, said grounding terminal comprising an arcuate-shaped portion in close proximity to and partially surrounding one of said circuit terminals, a plurality of protrusions integral with said arcuate-shaped portion welded to said housing, and a connection portion integral with and extending from said arcuate-shaped portion to receive a ground connection.

3. Terminal assembly set forth in claim 2, wherein said connection portion is disposed at an angle to said arcuate portion, whereby said grounding terminal has a generally L-shaped cross section through said arcuate and connection portions.

4. The terminal assembly set forth in claim 2, comprising an insulator disposed about and generally perpendicular to said plurality of circuit terminals and extending beyond said terminals, and wherein said arcuate and connection portions of said grounding terminal are disposed at an angle to each other such that said grounding terminal has a generally L-shaped cross section therethrough to provide access around said insulator to said connection portion.